(12) United States Patent
Hsia

(10) Patent No.: US 9,913,330 B2
(45) Date of Patent: Mar. 6, 2018

(54) SOLID-STATE LIGHTING OPERABLE WITH COMPACT FLUORESCENT BALLASTS AND AC MAINS

(71) Applicant: Lightel Technologies, Inc., Renton, WA (US)

(72) Inventor: Chungho Hsia, Bellevue, WA (US)

(73) Assignee: LIGHTEL TECHNOLOGIES, INC., Renton, WA (US)

( * ) Notice: Subject to any disclaimer, the term of this patent is extended or adjusted under 35 U.S.C. 154(b) by 0 days.

(21) Appl. No.: 15/275,220

(22) Filed: Sep. 23, 2016

(65) Prior Publication Data

US 2017/0013688 A1    Jan. 12, 2017

Related U.S. Application Data

(63) Continuation-in-part of application No. 15/132,167, filed on Apr. 18, 2016, now Pat. No. 9,801,241, (Continued)

(51) Int. Cl.
*H05B 33/08* (2006.01)
*F21V 17/12* (2006.01)
*F21V 23/06* (2006.01)
*F21V 25/04* (2006.01)
*H02M 1/32* (2007.01)
*F21K 9/27* (2016.01)
*F21K 9/66* (2016.01)
(Continued)

(52) U.S. Cl.
CPC .......... *H05B 33/0815* (2013.01); *F21K 9/27* (2016.08); *F21K 9/66* (2016.08); *F21V 23/06* (2013.01); *F21V 25/04* (2013.01); *H02M 1/32* (2013.01); *H05B 33/0803* (2013.01); *H05B 33/0806* (2013.01); *H05B 33/0845* (2013.01); *H05B 33/0884* (2013.01); *F21V 29/70* (2015.01); *F21Y 2107/30* (2016.08); *F21Y 2115/10* (2016.08); *H02M 2001/0058* (2013.01); *Y02B 20/347* (2013.01); *Y02B 70/1491* (2013.01)

(58) Field of Classification Search
None
See application file for complete search history.

(56) References Cited

U.S. PATENT DOCUMENTS 8,985,794 B1 * 3/2015 Katona .................... F21K 9/56
362/84
9,080,733 B2 * 7/2015 Rowley .................... F21K 9/90
(Continued)

*Primary Examiner* — Douglas W Owens
*Assistant Examiner* — James H Cho
(74) *Attorney, Agent, or Firm* — Han IP Corporation; Andy M. Han

(57) ABSTRACT

A light-emitting diode (LED)-based solid-state lamp using an LED driving circuit with an electric current control operates normally for a regulated power from either a compact fluorescent (CFL) electronic ballast or AC mains. The LED driving circuit together with a matching circuit is configured to optimize resonant characteristics of the CFL electronic ballast used and enhance lamp compatibility without flickering, which in turn reduces possibility of overheating and fires due to incompatibility. With a cycle-by-cycle current control and power switching at a constant on-time and varied off-time, an over-rated surge current is limited, preventing occasional fire hazards occurred in both the CFL electronic ballast and the LED lamp.

16 Claims, 14 Drawing Sheets

Related U.S. Application Data which is a continuation-in-part of application No. 15/050,363, filed on Feb. 22, 2016, now Pat. No. 9,544,959, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/535,249, filed on Jun. 27, 2012, now abandoned.

(51) Int. Cl.
*F21V 29/70* (2015.01)
*F21Y 115/10* (2016.01)
*H02M 1/00* (2006.01)
*F21Y 107/30* (2016.01)

(56) References Cited

U.S. PATENT DOCUMENTS

| | | | | |
|---|---|---|---|---|
| 2010/0148673 | A1* | 6/2010 | Stewart | H05B 33/0803 |
| | | | | 315/121 |
| 2012/0019714 | A1* | 1/2012 | Hiramatu | H05B 33/0815 |
| | | | | 348/370 |
| 2015/0250034 | A1* | 9/2015 | Esaki | H02M 3/156 |
| | | | | 315/186 |
| 2016/0323957 | A1* | 11/2016 | Hu | H05B 33/0854 |

* cited by examiner

SOLID-STATE LIGHTING OPERABLE WITH COMPACT FLUORESCENT BALLASTS AND AC MAINS

CROSS-REFERENCE TO RELATED APPLICATIONS

The present disclosure is a continuation-in-part (CIP) application of U.S. patent application Ser. No. 15/132,167, filed 18 Apr. 2016, which is a CIP application of U.S. patent application Ser. 15/050,363, filed 22 Feb. 2016 and issued as U.S. Pat. No. 9,544,959 on 10 Jan. 2017, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 01 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. The above-identified applications are incorporated herein by reference in their entirety.

BACKGROUND

Technical Field

The present disclosure relates to light-emitting diode (LED) lamps that work with conventional compact fluorescent (CFL) lamp fixtures configured to electrically connect either CFL electronic ballasts or AC mains.

Description of the Related Art

Solid-state lighting from semiconductor light-emitting diodes (LEDs) has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, universal uses of such LED lighting under environments of both AC mains and electronic ballasts with uncertainty become especially important and need to be well addressed.

In today's retrofit application of an LED lamp to replace an existing fluorescent lamp, consumers may choose either to adopt a ballast-compatible LED lamp with an existing ballast used to operate the fluorescent lamp or to employ an AC mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, a ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effectively solution by using an LED lamp that can be used with the AC mains and is compatible with a ballast so that LED lamp users can save an initial cost by changeover to such an LED lamp followed by retrofitting the lamp fixture to be used with the AC mains when the ballast dies.

Ballasts have several different types. However in the US, electronic ballasts are most popular in lamp fixtures because they are more efficient and less expensive than other types of ballasts. Nevertheless, it is better for the ballast-compatible LED lamp to be compatible with either electronic ballasts or other types of ballasts.

As mentioned above, a cost-effective solution may be to use a ballast as part of an LED driver to operate an LED lamp. In some prior art schemes, a switching mode power supply (SMPS) type LED driver is proposed to use with a ballast, but has not been completely accepted due to occasional fires that arise inside the ballast. The cause of these fires has been identified to be a large dc input capacitor in the SMPS type LED driver, which may destroy a capacitor in the ballast due to excessive initial resonant voltage. A conventional SMPS type LED driver for AC mains comprises a Buck converter, which can efficiently convert input voltages of 110~277 VAC into a DC voltage required to power LEDs in an LED lamp. However, the ballast has an output voltage much higher than 277 VAC with a frequency well above 60 Hz. Such a Buck converter is controlled by a control logic, which has several drawbacks that limit its use in ballast applications. First, the control logic has a low operating voltage range which inherently limits the wide range of input voltages that can be used. Second, an over-voltage protection (OVP) function in the control logic starts at a low voltage limited by the low operating voltage. When an input voltage from a ballast exceeds a certain value, OVP functions to stop operation, shutting down the lamp. Third, the Buck converter operates in a continuous conduction mode, in which an input current fails to follow the input voltage, leading to a low power factor with the AC mains and turn-on or other operational failures with the ballast. Fourth, the control logic is solely powered by a voltage built up by an input capacitor with a small capacitance to meet a short start-up requirement. When the input voltage drops to the minimum operating voltage level, the control logic fails to operate and sends no signals to turn on a switch used in the Buck converter, and the Buck converter stops to function until the input voltage level recovers, resulting in flickering. In general, conventional LED drivers fail to work with a ballast and to properly operate an LED lamp at a regulated power, resulting in unstable lighting output. It goes without saying that the same LED drivers can flawlessly operate an LED lamp with the AC mains.

SUMMARY

The present disclosure aims to provide a novel approach that can be adopted to operate an LED lamp with input voltages either from the AC mains or a CFL electronic ballast and with an LED current regulated in either case.

The LED lamp may include a plurality of LED printed circuit boards (LED PCBs), a light emission portion comprising LED arrays disposed on the LED PCBs and tube lenses, at least one bridge rectifier, and an LED driving circuit. The LED lamp is used to replace a CFL lamp in a retrofit or newly-made lamp fixture that could have an existing ballast or simply an AC mains-ready configuration. When such an LED lamp is installed in the fixture, the LED driving circuit can detect how high an input voltage and frequency and make proper and necessary management so that the LED lamp can operate with the existing CFL electronic ballast or simply with the AC mains without operational uncertainty.

The LED driving circuit may include an electric current control circuit, a Buck converter in communicating with the electric current control circuit, and an output capacitor in connected to the Buck converter to build up an output voltage and to power the LED arrays. The LED lamp may further comprise an electrical adapter configured to optimize a resonant voltage and a resonant current from the CFL electronic ballast for better compatibility with various CFL electronic ballasts, reducing possibility of overheating and fires. In some cases, the LED driving circuit may further comprise a passive power factor correction (PFC) circuit to sustain operations of the LED arrays if no inherent active PFC is adopted. In some cases, the LED driving circuit may further comprise a voltage feedback scheme to sustain operations of the electric current control circuit so that the LED lamp can operate without flickering. The Buck converter comprises a switch controlled by the electric current control circuit, a current sensing resistor, a diode, and an inductor with its current charging and discharging controlled by the switch. The electric current control circuit detects zero current in the inductor, generating a signal to control the switch on and off with a constant on-time and a varied off-time controlled by the zero current detection signal. By adapting switching frequencies for a high frequency associated with the CFL electronic ballast and a low frequency associated with a magnetic ballast or the AC mains, the LED driving circuit can provide an accurate output LED current required to operate the LED arrays no matter what input voltage is a high CFL electronic ballast output voltage or a regular 110 or 277 VAC from the AC mains. Not like prior art schemes that use an AC impedance control in electronic ballast compatible lamps, the LED driving circuit according to the present disclosure adopts a scheme using switching mode power supply with a regulated output power and a current in the CFL electronic ballast compatible LED lamps. The same switching mode power supply used in the LED driving circuit to work with the CFL electronic ballast can also be applied to the LED lamp in operating with the AC mains.

The light emission portion in the LED lamp further comprises a heat sink portion and tube lenses. The heat sink portion comprises one or more mounting surfaces facing outwards with the LED PCBs mounted on the surfaces. Each of the LED PCBs is covered by one of the tube lenses in a way that the emission light from the LED arrays emits omni-directionally. Each of the tube lenses further comprises an internal pedestal to tightly compress relative one of the LED PCBs on the heat sink portion when such tube lenses are installed in the LED lamp. Each of the tube lenses may further comprise a lens perpendicular to the at least one tube lens, configured to cover an opening of the at least one tube lens and to secure the at least one tube lens without movement

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF VARIOUS EMBODIMENTS

Figure 1:
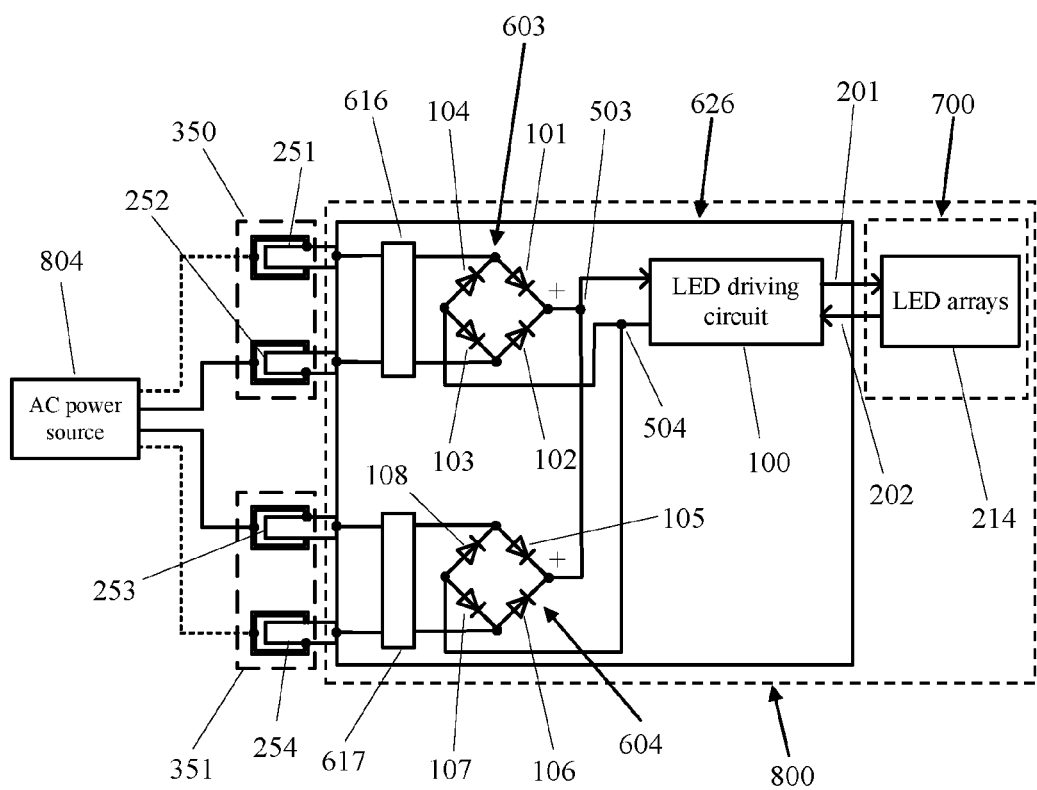
FIG. 1 is a block diagram of an LED lamp operable with an AC power source according to the present disclosure.

FIG. 1 is a block diagram of an LED lamp operable with an AC power source according to the present disclosure. The LED lamp 800 comprises a number of components, including: a light emission portion 700 comprising LED arrays 214; a lamp base portion 626 comprising electrical connection terminals 251, 252, 253, and 254; a first and a second bridge rectifiers 603 and 604; two interface modules 616 and 617; and an LED driving circuit 100. The first and the second bridge rectifiers 603 and 604 receive power from an alternating-current (AC) power source 804 via the two interface modules 616 and 617 and the four electrical connection terminals 251, 252, 253, and 254 and convert an AC voltage into a direct-current (DC) voltage. The AC power source 804 may be a CFL electronic ballast or AC mains. The electrical connection terminals 251 and 252 connect to a fixture socket 350, and the electrical connection terminals 253 and 254 connect to the other fixture socket 351. Each of the two interface modules 616 and 617 is configured to mimic a filament circuit connecting between the electrical connection terminals 251 and 252 and between the electrical connection terminals 253 and 254 to work with the CFL electronic ballast so that the CFL electronic ballast can continue a process in its startup operation used for conventional CFL lamps. Because the LED lamp 800 is utilized to replace a CFL lamp that operates with the CFL electronic ballast, the LED lamp 800 must be compatible with such a ballast. Otherwise, an initial startup failure will occur, and the LED lamp 800 will not light up. Each of the two interface modules 616 and 617 must have a low impedance such as less than hundreds of ohms at a high frequency such as 65 kHz or higher when operated with the CFL electronic ballast and a high impedance such as several of kilo ohms at 50/60 Hz when operated with the AC mains. The best choice is to make such high and low impedances in a way that an impedance ratio between the high impedance and the low impedance is higher than 13 at frequencies between 60 Hz and 65 kHz. In the case that both two interface modules 616 and 617 have a low impedance, for example, 10 ohms or less at 60 Hz, frequently used as a filament circuit for a fluorescent lamp, when the AC mains are accidentally applied between the electrical connection terminals 251 and 252 or between the electrical connection terminals 253 and 254, a large current can flow through and burn out the two interface modules 616 and 617 immediately, thereby causing a fire hazard. After detecting that such a filament circuit does exist in the two interface modules 616 and 617 in a short period, the CFL electronic ballast will start to generate a high voltage, which will appear between the fixture sockets 350 and 351. The LED driving circuit 100 is connected to the first and the second bridge rectifiers 603 and 604 through two interconnecting ports 503 and 504. The first bridge rectifier 603 comprises four diodes, 101, 102, 103, and 104 while the second bridge rectifier 604 comprises four diodes, 105, 106, 107, and 108. In the first bridge rectifier 603, the four diodes 101-104 are interconnected with four input/output ports. Similarly, in the second bridge rectifier 604, the four diodes 105-108 are interconnected with four input/output ports. The first and the second bridge rectifiers 603 and 604 are connected to the LED driving circuit 100 in parallel such that the positive and the negative input/output ports 503 and 504 of the first bridge rectifier 603 respectively connect to the positive and the negative input/output ports of the second bridge rectifier 604. The high electric potential at the input/output port 503 and the low electric potential at the input/output port 504 then respectively connect to the high side and the low side of the LED driving circuit 100 with the low electric potential port 504 as a common ground. Furthermore, the eight diodes 101-108 in the first and the second bridge rectifiers 603 and 604 are partially paired to perform a full-wave rectification of an AC voltage from the CFL electronic ballast or the AC mains according to wiring configuration in the lamp fixture. A diode conducts an electric current if it is forward biased but blocks a current flow if it is reversed biased. Taking advantage of this property, each diode in the first and the second bridge rectifiers 603 and 604 can sense an electric potential difference between its two ports and convert AC to DC if an AC voltage is applied to a circuit with a diode connected in a proper manner. With the eight diodes 101-108 configured in FIG. 1, the first and the second bridge rectifiers 603 and 604 can control the electric current flows into and returns from the LED driving circuit 100, thus delivering power to the LED driving circuit 100, which in turn powers up the LED arrays 214 via connection ports 201 and 202.

Figure 2:
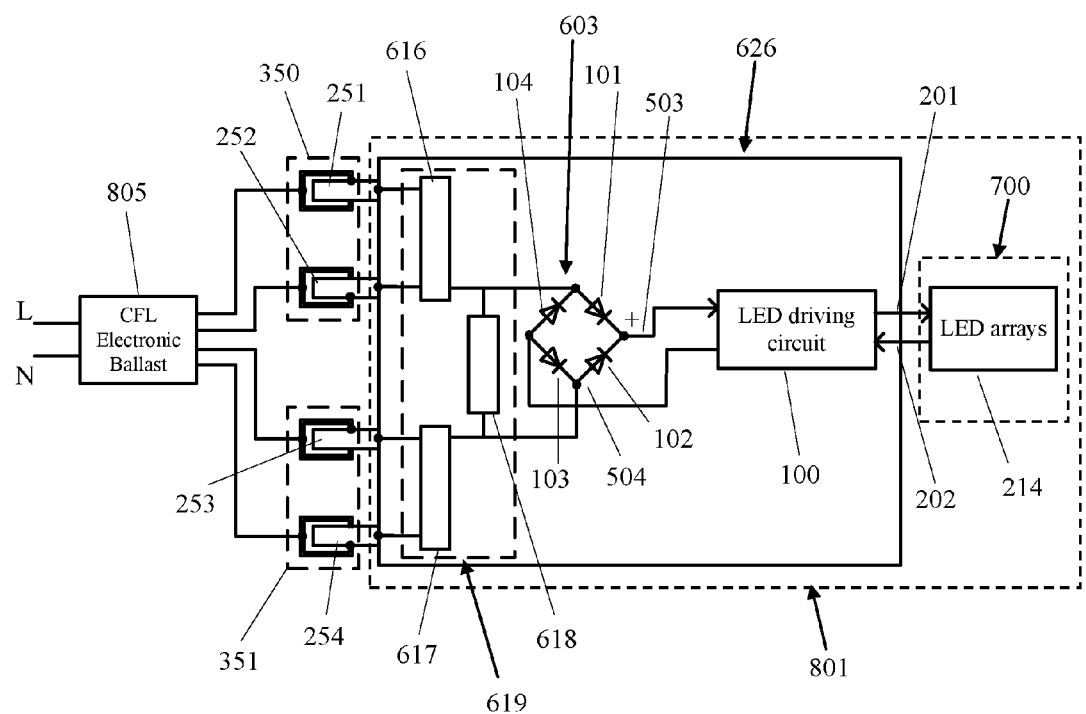
FIG. 2 is a block diagram of an LED lamp operable with a CFL electronic ballast according to the present disclosure.

FIG. 2 is a block diagram of an LED lamp operable with a CFL electronic ballast according to the present disclosure. The LED lamp 801 comprises a number of components, including: a light emission portion 700 comprising LED arrays 214; a lamp base portion 626 comprising electrical connection terminals 251, 252, 253, and 254; an electrical adapter 619 comprising two interface modules 616 and 617 and a matching circuit 618; an LED driving circuit 100; and a bridge rectifier 603. The bridge rectifier 603 receives power from a CFL electronic ballast 805 via the four electrical connection terminals 251, 252, 253, and 254, the two interface modules 616 and 617, and the matching circuit 618, and converts an AC voltage into a DC voltage. The functions of each component are the same as depicted in FIG. 1 except that the electrical adapter 619 comprises the two interface modules 616 and 617 and the matching circuit 618, which converts four ports into two ports in a way that only one bridge rectifier 603 is needed. Each of the two interface modules 616 and 617 may comprise a jumper connection. The matching circuit 618 is essential to operate the LED lamp because it can optimize a resonant voltage and a resonant current from the CFL electronic ballast 805, reducing possibility of lamp flickering and startup failure. Experimental tests show that the jumper connections between the electrical connection terminals 251 and 252 and between the electrical connection terminals 253 and 254 can work with the CFL electronic ballast 805 in a way that the CFL electronic ballast 805 can continue its process in its startup operation to light up the LED lamp 801.

Figure 3:
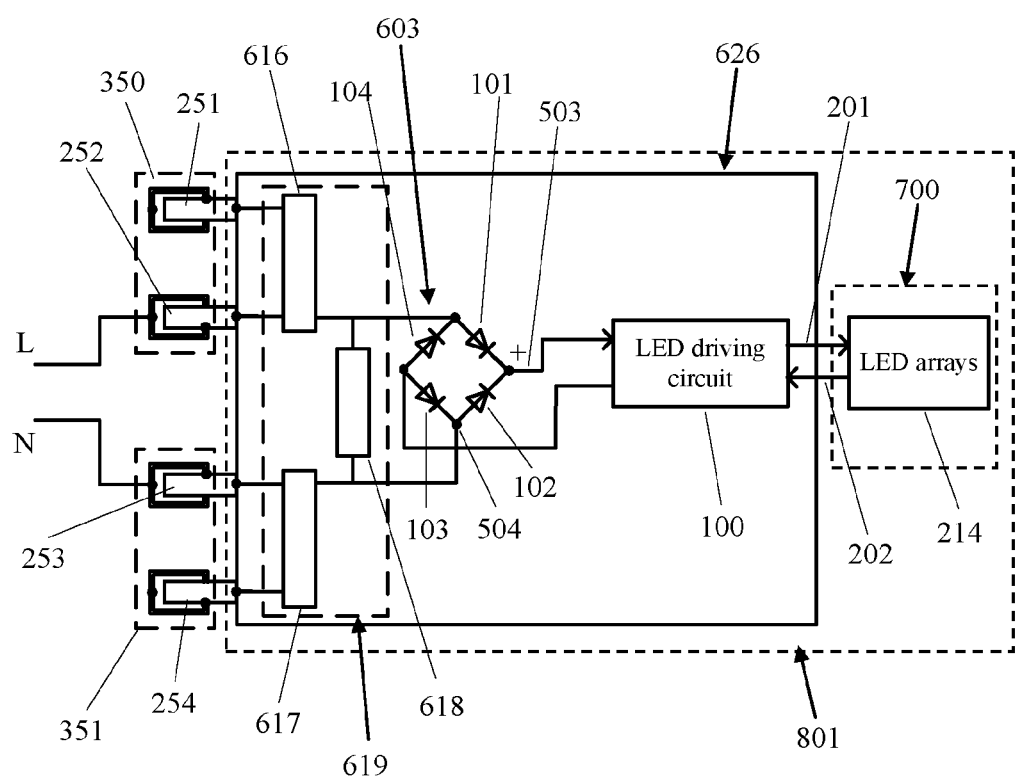
FIG. 3 is a block diagram of an LED lamp operable with AC mains according to the present disclosure.

FIG. 3 is a block diagram of an LED lamp operable with AC mains according to the present disclosure. FIG. 3 is similar to FIG. 2 except that the input voltage is from the AC mains. Although the AC mains are only connected to the electrical connection terminals 252 and 253 in FIG. 3, the LED lamp 801 is operable as long as either "L" or "N" in the AC mains connects to either one of the electrical connection terminals 251 and 252, and the other connects to either one of the electrical connection terminals 253 and 254.

Figure 4:
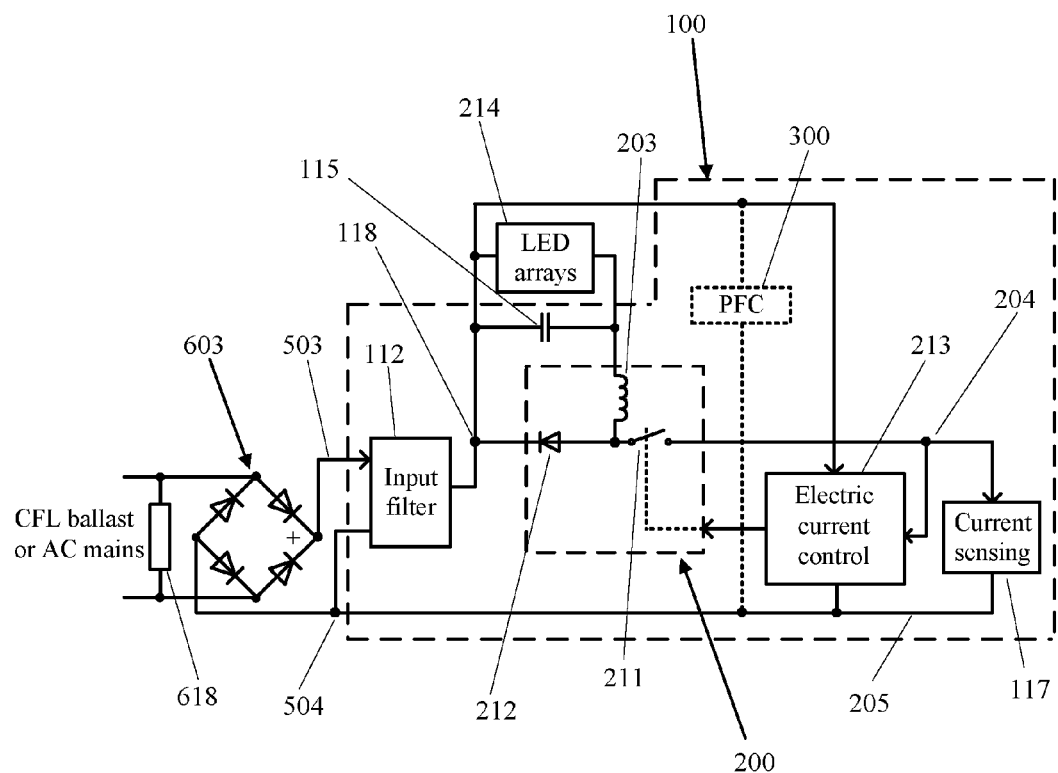
FIG. 4 is the first embodiment of an LED driving circuit used in an LED lamp operable with either AC mains or a CFL electronic ballast according to the present disclosure.

FIG. 4 is the first embodiment of an LED driving circuit used in an LED lamp operable with either AC mains or a CFL electronic ballast according to the present disclosure. A bridge rectifier 603 connecting to an AC source, either the AC mains or a CFL electronic ballast, converts an AC into a DC voltage. An LED driving circuit 100 connecting to the bridge rectifier 603 comprises an input filter 112 used to filter the input voltage and to suppress EMI noise created in the LED driving circuit 100; an electric current control circuit 213; a Buck converter 200 in communicating with the electric current control circuit 213; an output capacitor 115 in parallel with LED arrays 214, connected to the Buck converter 200 to build up an output voltage and to power the LED arrays 214; and a current sensing resistor 117. In order to improve a power factor with an AC-mains input, a power factor correction (PFC) circuit 300 may be configured in the LED driving circuit 100 to provide additional energy to sustain operations of the LED arrays 214 when the output capacitor 115 is intentionally made small. The bridge rectifier 603 has four input/output ports, among which a high electric potential appears at the input/output port 503, and a low electric potential appears at the input/output port 504 respectively connecting to the high side and the low side of the input filter 112 with the low electric potential port 504 as a common ground. In front of the bridge rectifier 603 is a matching circuit 618 configured to optimize a resonant voltage and a resonant current from the CFL electronic ballast for better compatibility with various CFL electronic ballasts. The Buck converter 200 comprises a switch 211 controlled by the electric current control circuit 213 (e.g., to be turned on and off), a diode 212, and an inductor 203 with its current charging and discharging controlled by the switch 211. The electric current control circuit 213 detects zero current in the inductor 203, generates a zero current detection signal, and controls the switch 211 on and off with a constant on-time and a varied off-time controlled by the zero current detection signal. By adapting switching frequencies for a high frequency associated with the CFL electronic ballast and a low frequency associated with the AC mains, the electric current control circuit 213 controls the switch 211 on and off in a way that the inductor 203 is charged during on-time and discharged during off-time, and that a desired output voltage $V_o$ across the LED arrays 214 is reached to light up the LED arrays 214. The average inductor current is thus equal to the output current that flows into the LED array 214. When the switch 211 is on, the diode 212 is reverse-biased, and an input current flows from the bridge rectifier 603, an output port 118 of the input filter 112, the LED arrays 214, the inductor 203, the switch 211, the first port 204 of the current sensing resistor 117, the current sensing resistor 117 itself, the second port 205 of the current sensing resistor 117, and returns to the bridge rectifier 603, completing a power transfer to the LED arrays 214. When the current flowing into the inductor 203 increases, the voltage across the current sensing resistor 117 increases. The first port 204 of the current sensing resistor 117 connects with the electric current control circuit 213, which continuously receives signals and adjusts on-time and off-time such that the output voltage and current to the LED arrays 214 are regulated to meet the output requirements. The output capacitor 115, in parallel with the LED arrays 214, connects to the inductor 203 and receives energy to build up an output voltage and to power the LED arrays 214. For AC mains operation, the PFC circuit 300 is needed not only to improve a power factor but also to provide enough power required to operate the LED arrays 214. Otherwise, the output capacitor 115 needs to have a larger capacitance to power up the LED arrays without flickering.

The electric current control circuit 213 operates in a wide range of input voltages from approximately 9 V to 450 VDC to accommodate various DC voltages rectified from AC mains such as voltages 90-277 V and from CFL electronic ballasts such as 350 V. When a supplied voltage to the electric current control circuit 213 decreases due to its increased internal operations and controls, and when the input voltage drops from half of AC line peak voltage to the minimum value of the voltage at positive port of the LED arrays 214 relative to the common ground 254, the capacitors in the PFC circuit 300 supply a current to the electric current control circuit 213 and sustain its operations. In the electric current control circuit 213, a startup resistor (not shown) is so designed to operate the LED lamp 801 (in FIG. 3) at the lowest input voltage of 90 VAC. When the highest voltage 350 VAC from the CFL electronic ballast comes in, a higher proportional voltage appears at an input of the internal logic control circuit. Therefore an operating voltage for the internal logic control circuit must be in a wide range such as 11~35 volts, direct current (VDC) rather than 5~15 VDC as in a conventional logic control device. To meet requirements of startup time and current without turn-on failure or flickering occurred at the lamp startup, the input capacitor in the electric current control circuit 213 with a minimum capacitance must be used at the input of the internal logic control circuit. The voltage feedback from the PFC circuit 300 is thus needed to pump in energy in time and to sustain the operating voltage and ensure no flickering occurred when operating the LED lamp 801.

When the switch 211 is off, the diode 212 is forward-biased, and the inductor 203 discharges with a loop current flowing from the diode 212 and the LED arrays 214 back to the inductor 203. The current sensing resistor 117 keeps track of an average of the LED current and feedbacks to the electric current control circuit 213 to control the switch 211 on and off. The closed loop operation in on-time of the switch 201 though ensures the output current to be accurately controlled within an acceptable level.

Figure 5:
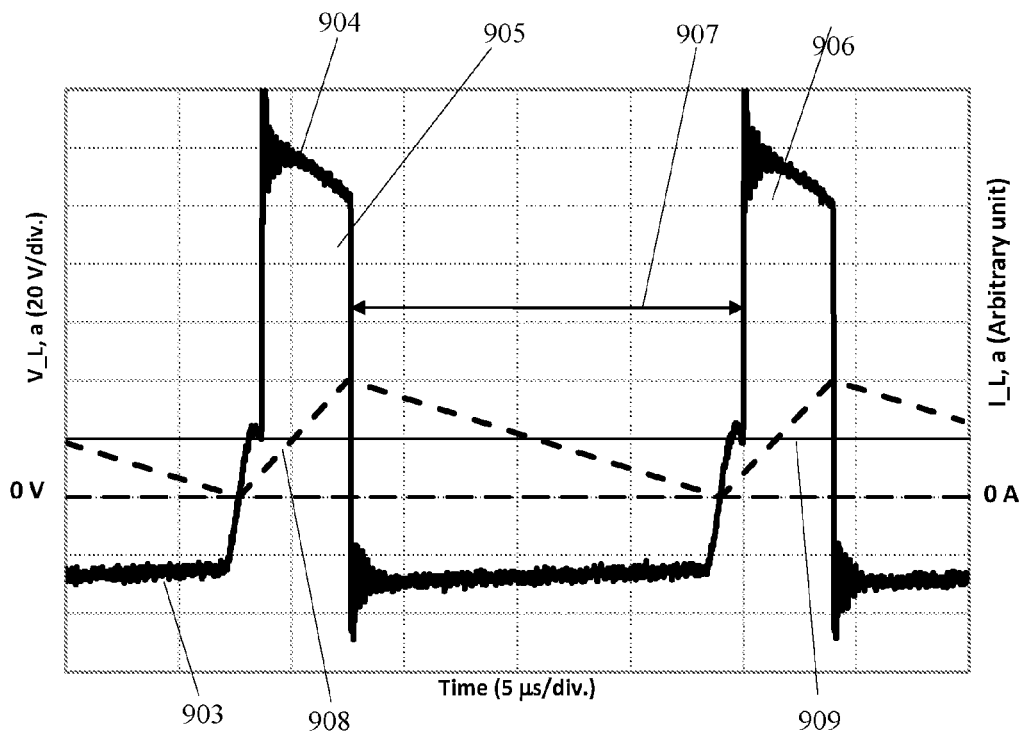
FIG. 5 is a waveform of a voltage measured across an inductor used in the LED driving circuit depicted in FIG. 4 when AC mains are used to power the LED lamp according to the present disclosure.

FIG. 5 is a waveform of a voltage measured across an inductor used in the LED driving circuit depicted in FIG. 4 when a power from AC mains is used to operate the LED lamp according to the present disclosure. Referring to FIGS. 4 and 5, when 120 V/60 Hz of the AC mains is applied to the LED lamp, the bridge rectifier 603 outputs a DC voltage ($V_{DC}$) of 158 V (peak), and the inductor 203 is charged when the switch 211 is on. The high level at 904 represents $V_{DC, a} - V_o$, where $V_{DC, a}$ is a voltage output from the switch 211 when the LED driving circuit 100 is powered by 120 V AC mains, and $V_o$ is a desired voltage across the LED arrays 214. The low level 903 represents $-V_o$. The voltage $V_{L, a}$ function of time across the inductor 203 shows two pulses 905 and 906, each with a pulse width of 3.95 μs, representing on-time of the switch 211 for 120 V AC mains input. The inductor 203 is discharged when the switch 211 is off. As seen in FIG. 5, an inductor current 908 increases linearly with on-time from the zero current when charged, reaching a maximum inductor current at the end of on-time, then starting to discharge from the maximum inductor current during off-time. At the end of discharge cycle, the inductor current decreases to zero, and the electric current control circuit 213 detects the zero current and turns on the switch 211 for a next charging cycle. An average inductor current 909 then represents a desired output current to operate the LED arrays 241. For a $V_{DC, a}$ of 158 V rectified from the 120

V AC mains entering the LED driving circuit 100, on-time is fixed at 3.95 µs, whereas off-time of the switch 201 varies as determined by the zero inductor current. In FIG. 5, the off-time period 907 of 17.4 µs appears in between the two pulses 905 and 906. Thus the corresponding switching frequency is 46.8 kHz. This means that hundreds of inductor charging cycles are used for each half cycle of the 120 V AC mains input. However, the switching frequencies vary from 30 kHz to 110 kHz for each half cycle of the 120 V AC mains input because the $V_{DC,a}$ has a sinusoidal dependency, and off-time varies accordingly. In FIG. 5, a duty cycle of 0.185 gives a desired output voltage $V_o$ with a constant output current, yielding a regulated power to operate the LED arrays 214 when the 110 VAC is used with the LED driving circuit 100. For a 277 VAC/60 Hz input, experimental results are similar to the ones depicted above for 110 VAC input with a shorter switch on-time and a longer off-time because the input voltage of 277 V is more efficient than 110 VAC to charge the inductor 203 in a shorter period of on-time.

Figure 6:
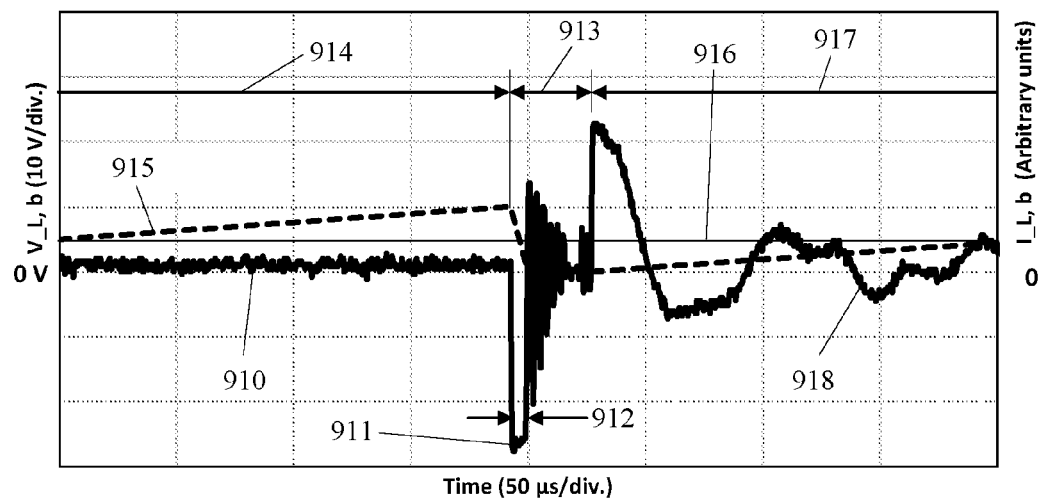
FIG. 6 is a waveform of a voltage measured across an inductor used in the LED driving circuit depicted in FIG. 4 when a CFL electronic ballast is used to operate the LED lamp according to the present disclosure.
Figure 7:
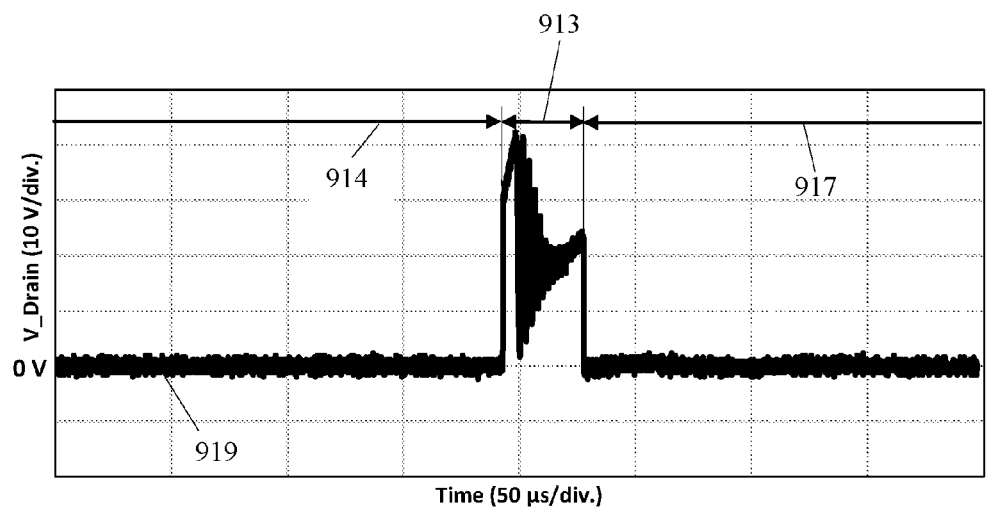
FIG. 7 is a waveform of a voltage measured at a high potential port of a switch used in the LED driving circuit depicted in FIG. 4 when a CFL electronic ballast is used to operate the LED lamp according to the present disclosure.

FIG. 6 is a waveform of a voltage measured across an inductor used in an LED driving circuit depicted in FIG. 4 when a CFL electronic ballast is used to operate the LED lamp according to the present disclosure. FIG. 7 is a waveform of a voltage measured at a high potential port of a switch used in the LED driving circuit depicted in FIG. 4 when a CFL electronic ballast is used to operate the LED lamp. When a CFL electronic ballast connects to the LED lamp with power on, it supplies a high voltage up to 324 VAC and a frequency in a range of 40~65 kHz, depending on ballast designs. Referring to FIGS. 4, 6, and 7, the bridge rectifier 603 is used to convert an AC voltage from the CFL electronic ballast into a DC voltage to power the LED driving circuit 100. The DC voltage is 340 V (root mean square, or rms), high enough to work with the Buck converter depicted in FIG. 4. However, the CFL electronic ballast is a current source with a rated current. When the PFC circuit 300 is present, a large in-rush current goes to charge capacitors in the PFC circuit 300, leading to a voltage clipping due to such an overdriven current beyond maximum capability the CFL electronic ballast can deliver. The inductor 203 is charged when the switch 211 is on and discharged when the switch 211 is off. In FIG. 6, the high level 910 during on-time 914 represents $V_{DC,b}-V_o$, where $V_{DC,b}$ is a voltage output from the switch 211 when the LED driving circuit is powered by the CFL electronic ballast, and $V_o$ is a desired output voltage across the LED arrays 214. The $V_{DC,b}$ is apparently compromised. The low level 911 represents $-V_o$. The voltage $V_{L,b}$ across the inductor 203 in FIG. 6 shows a negative pulse with a pulse width 913 of 34 µs, representing off-time of the switch 211. Because of the in-rush current mentioned above, a collapsed input voltage results in a very long on-time of 9.28 ms. As seen in FIG. 6, an inductor current 915 increases slowly during on-time 914 from the zero current, reaching a maximum inductor current at the end of on-time 914, then starting to discharge from the maximum inductor current during off-time 913. However, the voltage charged in the inductor 203 is only several volts; it's so low that the inductor 203 is discharged in a shorter period 912 than the off-time 913. At the end of the discharging cycle, the inductor current decreases to zero, and the electric current control circuit 213 detects the zero current and turns on the switch 211 for a next charging cycle. An average inductor current 916 then represents a compromised output current to operate the LED arrays 241. In FIG. 7, voltage at the high potential port (left port) of the switch 211 is monitored, where the voltage is near zero during on-time 914 and reaches a maximum during off-time 913, corresponding respectively to such a switch on and a switch off. In period of 917, when the switch 211 is on again, the voltage across the inductor struggles to build up a voltage of $V_{DC,b}-V_o$ but collapses and settles at a stabilized voltage as the one during on-time 914.

Figure 8:
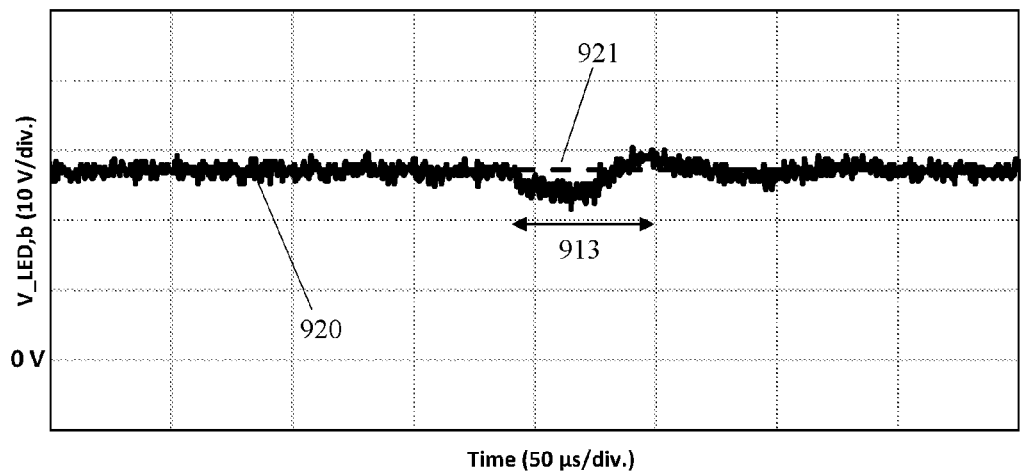
FIG. 8 is a waveform of a voltage measured across the LED arrays depicted in FIG. 4 when a CFL electronic ballast is used to operate the LED lamp according to the present disclosure.

FIG. 8 is a waveform of a voltage measured across the LED arrays depicted in FIG. 4 when a CFL electronic ballast is used to operate the LED lamp according to the present disclosure. Although output current is compromised due to the in-rush current and the collapsed input voltage, a desired average output voltage 921 across LED arrays is still present regardless of noise and ripples existing in the voltage waveform 920 during switch off-time 913, which normally operates the LED arrays without flickering.

Figure 9:
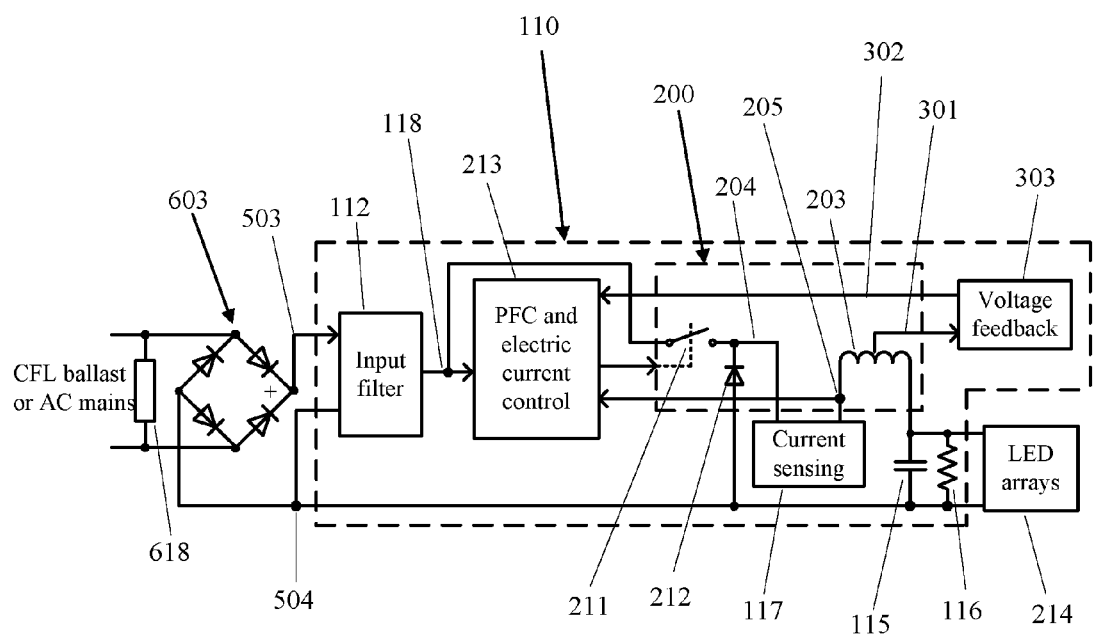
FIG. 9 is the second embodiment of an LED driving circuit used in an LED lamp operable with either AC mains or a CFL electronic ballast according to the present disclosure.

FIG. 9 is the second embodiment of an LED driving circuit used in an LED lamp operable with either AC mains or a CFL ballast according to the present disclosure. A bridge rectifier 603 connecting to an AC source, either the AC mains or a CFL electronic ballast, converts an AC into a DC voltage. An LED driving circuit 110 connecting to the bridge rectifier 603 comprises an input filter 112 used to filter the input voltage and to suppress EMI noise created in the LED driving circuit 110, a PFC and electric current control circuit 213, a Buck converter 200 in communicating with the PFC and electric current control circuit 213, an output capacitor 115 in parallel with a resistor 116 connected to the Buck converter 200 to build up an output voltage and to power the LED arrays 214, a current sensing resistor 117, and a voltage feedback module 303 extracting partial energy from the output voltage to sustain the PFC and electric current control circuit 213. The bridge rectifier 603 has four input/output ports, among which a high electric potential appears at the input/output port 503, and a low electric potential appears at the input/output port 504 respectively connecting to the high side and the low side of the input filter 112 with the low electric potential port 504 as a common ground. In parallel with two of the input/output ports of the bridge rectifier 603, connected with the AC source, is a matching circuit 618 configured to optimize a resonant voltage and a resonant current from the CFL electronic ballast 805 (FIG. 2). The matching circuit 618 is essential to operate the LED lamp using the CFL electronic ballast 805 because it reduces the possibility of lamp flickering and startup failure. The Buck converter 200 comprises a switch 211 controlled by the PFC and electric current control circuit 213, a diode 212, and an inductor 203 with its current charging and discharging controlled by the switch 211. The PFC and electric current control circuit 213 detects zero current in the inductor 203 within an AC cycle of an input voltage generating a zero current detection signal and controls the switch 211 on and off with a constant on-time and a varied off-time controlled by the zero current detection signal. By adapting switching frequencies for a high frequency associated with a CFL electronic ballast and a low frequency associated with the AC mains, the PFC and electric current control circuit 213 controls the switch 211 on and off in a way that the inductor 203 is charged during on-time and discharged during off-time, and that a desired output voltage $V_o$ across the LED arrays 214 is reached to light up the LED arrays 214. The average inductor current is thus equal to the output current that flows into the LED array 214. When the switch 211 is on, the diode 212 is reverse-biased, and an input current flows from an output port 118 in the input filter 112, the switch 211, the first port 204 of the current sensing resistor 117, the current sensing resistor 117 itself, and the second port 205 of the current sensing resistor 117, into the inductor 203. When the current flowing into the inductor 203 increases, the voltage across the current sensing resistor 117 increases. The second port 205 of the current sensing resistor 117 connects with the PFC and electric current control circuit 213, which continuously receives signals and adjusts off-time such that the output voltage and current to the LED arrays 214 are regulated to meet the output requirements. The output capacitor 115 in parallel with the resistor 116 connects to the inductor 203, receiving energy to build up an output voltage and to power the LED arrays 214.

The inductor 203 configured as an autotransformer has a center-tapped port connecting to the voltage feedback module 303 comprising a diode. The voltage feedback module 303 has two connection ports 301 and 302, with the first connection port 301 connecting to the center-tapped port of the inductor 203 and with the second connection port 302 connecting to the PFC and electric current control circuit 213. The PFC and electric current control circuit 213 has an input capacitor (not shown) with a voltage built up to supply an internal logic control circuit (not shown) in the PFC and electric current control circuit 213 When the voltage decreases due to its increased internal operations and controls, and when the voltage at the center-tapped port of the inductor 203 is higher than the supplying voltage, the diode in the voltage feedback module 303 conducts to supply a current to the PFC and electric current control circuit 213 and sustain its operations. The function of the voltage feedback module 303 is essential because the LED driving circuit 110 has a wide range of operating voltages not only 110 and 277 VAC for AC mains but also 324 VAC for a CFL electronic ballast. In the PFC and electric current control circuit 213, a startup resistor (not shown) is so designed to operate the LED lamp at the lowest input voltage 110 VAC. When the highest voltage 324 VAC from the CFL electronic comes in, a higher proportional voltage appears at an input of the internal logic control circuit. Therefore an operating voltage for the internal logic control circuit must be in a wide range such as 11~35 VDC rather than 5~15 VDC as in a conventional logic control device. To meet requirements of startup time and current without turn-on failure or flickering occurred at the lamp startup, the input capacitor in the PFC and electric current control circuit 213 with a minimum capacitance must be used at the input of the internal logic control circuit. The voltage feedback module 303 is thus needed to pump in energy in time and to sustain the operating voltage and to ensure no flickering occurred when operating the LED lamp.

Figure 10:
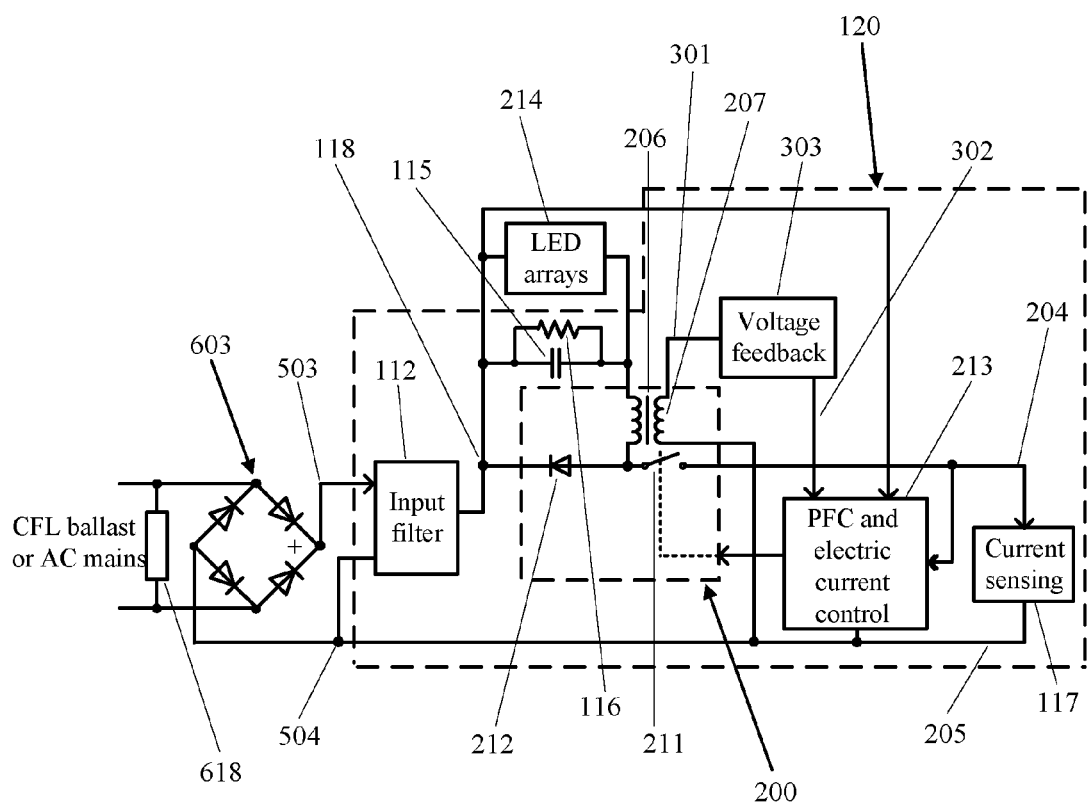
FIG. 10 is the third embodiment of an LED driving circuit used in an LED lamp operable with either AC mains or a CFL electronic ballast according to the present disclosure.

When the switch 211 is off, the diode 212 is forward-biased, and the inductor 203 discharges with a loop current flowing from the LED arrays 214, the diode 212, the current sensing resistor 117, back to the inductor 203. The current sensing resistor 117 keeps track of the output current and feedbacks to the PFC and electric current control circuit 213 to further control the switch 211 on and off. The closed loop operation in both on-time and off-time of the switch 211 ensures the output current to be accurately controlled within 4%. FIG. 10 is the third embodiment of an LED driving circuit used in an LED lamp operable with either AC mains or a CFL ballast according to the present disclosure. FIG. 10 has all the components as in FIG. 9, except that interconnections are different, and a transformer 206 in FIG. 10 replaces the center-tapped inductor 203 in FIG. 9. In FIG. 10, the same numerals are used for the same components as in FIG. 9. In FIG. 10, when the power is supplied to an LED driving circuit 120, an input current enters the input filter 112 and then the PFC and electric current control circuit 213, turning on the switch 211. Whereas the diode 212 is reverse-biased, the input current goes from the resistor 116, a primary winding of the transformer 206, the switch 211, and the current sensing resistor 117 to the common ground 504, completing a current charging cycle. When the input current goes into the primary winding of the transformer 206, energy is stored in it. The PFC and electric current control circuit 213 detects an input voltage level and control the switch 211 on and off in a way that a desired output voltage $V_o$ across the LED arrays 214 is reached to light up the LED arrays 214. When the switch 211 is off, the diode 212 is forward-biased, and the primary winding of the transformer 206 releases the energy stored, resulting in a loop current flowing from the diode 212 and the LED arrays 214, back to the primary winding of the transformer 206, completing the energy transfer to the LED arrays 214. When the switch 211 is on, the input current flows into the LED arrays 214, the primary winding of the transformer 206, the switch 211, and the current sensing resistor 117, creating a voltage drop across the current sensing resistor 117. The voltage appearing at the port 204 of the current sensing resistor 117 inputs to the PFC and electric current control circuit 213 to control off-time of the switch 211. The voltage feedback module 303 has two connection ports 301 and 302, with the first connection port 301 connecting to a high side of a secondary winding 207 in the transformer 206 and with the second connection port 302 connecting to the PFC and electric current control circuit 213, as in FIG. 9. The voltage feedback module 303 continuously monitors the output voltage by using the secondary winding 207 in the transformer 206. When the voltage at the high side of the secondary winding 207 is higher than a becoming lower operating voltage in the PFC and electric current control circuit 213 due to increased internal operations, the diode (not shown) in the voltage feedback module 303 conducts to supply energy in time through the second connection port 302 to sustain the operating voltage in the PFC and electric current control circuit 213.

Figure 11:
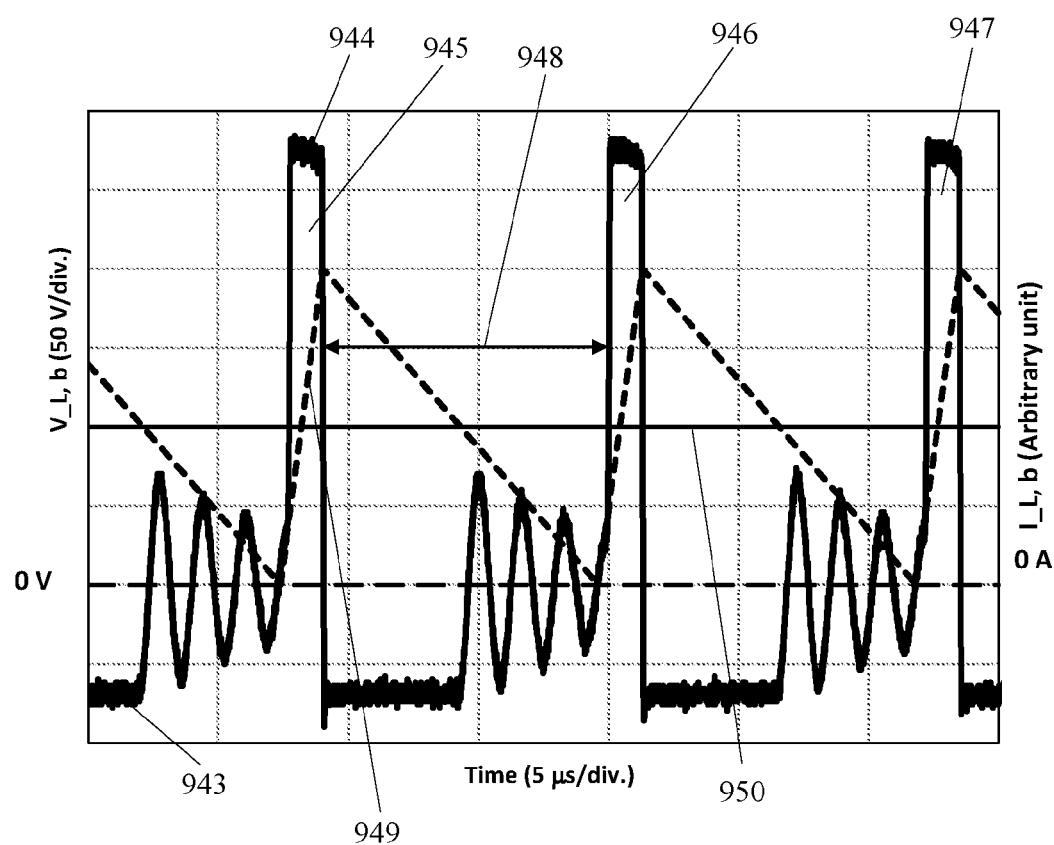
FIG. 11 is a waveform of a voltage measured across the inductor depicted in FIG. 10 when a CFL electronic ballast is used to power the LED lamp according to the present disclosure.

FIG. 11 is a waveform of a voltage measured across the inductor depicted in FIG. 10 when a CFL electronic ballast is used to power the LED lamp according to the present disclosure. Referring to FIG. 10, when an AC voltage of 324 V/65 kHz from the CFL electronic ballast is applied to the LED lamp 801, the bridge rectifier 603 outputs a DC voltage of 340 V (pk) with a ripple cycle of 7.69 µs equivalent to a frequency of 130 kHz, twice the operating frequency of the voltage supplied by the CFL electronic ballast. Referring to FIGS. 10 and 11, the inductor 203 is charged when the switch 211 is on. The high level 944 represents $V_{DC,\ b}-V_o$, where $V_{DC,\ b}$ is a voltage output from the switch 211 when the LED driving circuit 120 is powered by 324 VAC from the CFL electronic ballast, and $V_o$ is a desired voltage across the LED arrays 214. The low level 943 represents $-V_o$. The voltage $V_{L,\ b}$ function of time across the inductor 203 shows three pulses 945, 946, and 947, each with a pulse width of 1.36 µs, representing on-time of the switch 211 for the CFL electronic ballast input. The inductor 203 is discharged when the switch 201 is off. As seen in FIG. 11, an inductor current 949 increases linearly with the on-time from the zero current when charged, reaching a maximum inductor current at the end of on-time, then starting to discharge from the maximum inductor current during off-time. At the end of discharge cycle, the inductor current decreases to zero, and the PFC and electric current control circuit 213 detects the zero current and turns on the switch 211 for a next charging cycle. An average inductor current 949 then represents a desired output current to operate the LED arrays 241. For a $V_{DC}$ of 340 V rectified from the CFL electronic ballast entering the LED driving circuit 120, on-time is fixed at 1.36 µs, whereas off-time of the switch 211 varies as determined by the zero inductor current. In FIG. 11, off-time 948 of 10.9 μs appears in between the two pulses. Thus the corresponding switching frequency is 79.5 kHz. In FIG. 11, a duty cycle of 0.133 gives a desired output voltage $V_o$ with a constant output current, yielding a regulated power to operate the LED arrays 214 when the CFL electronic ballast is used with the LED driving circuit 120. As seen in FIG. 11, an inductor current 949 increases linearly during on-time 945 from the zero current, reaching a maximum inductor current at the end of on-time 945, then starting to discharge from the maximum inductor current during off-time 948. At the end of the discharging cycle, the inductor current decreases to zero, and the PFC and electric current control circuit 213 detects the zero current and turns on the switch 211 for a next charging cycle. An average inductor current 950 then represents a desired output current to operate the LED arrays 214.

Figure 12:
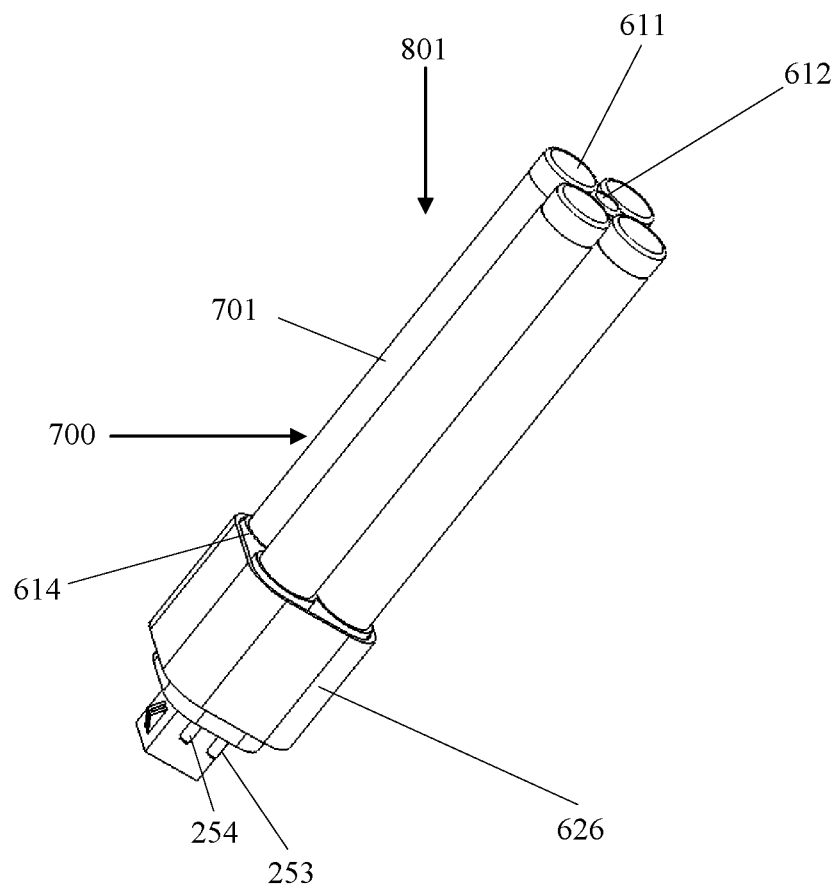
FIG. 12 is a perspective view of an LED lamp according to the present disclosure.

FIG. 12 is a perspective view of an LED lamp according to the present disclosure. In FIG. 12, an LED lamp 801 comprises a light emission portion 700 and a lamp base portion 626 comprising the electrical connection terminals 251, 252, 253, and 254 protruding outwards (only 253 and 254 shown in FIG. 12). The light emission portion 700 comprises four tube lenses 701, four lid lenses 611 covering the opening the four tube lenses 701, and a cosmetic lid 612 encircled by the four lid lenses 611. The lamp base portion 626 further comprises four lens holders 614 to hold the four tube lenses 701 at the end such that the lamp base portion 626 and the light emission portion 700 are connected. Inside the lamp base portion 626 is a hollow space, which can accommodate the electrical adapter 619, the bridge rectifier 603 (in FIGS. 2 and 3), and any one of the LED driving circuit 100 (in FIG. 4), 110 (in FIG. 9), or 120 (in FIG. 10).

Figure 13:
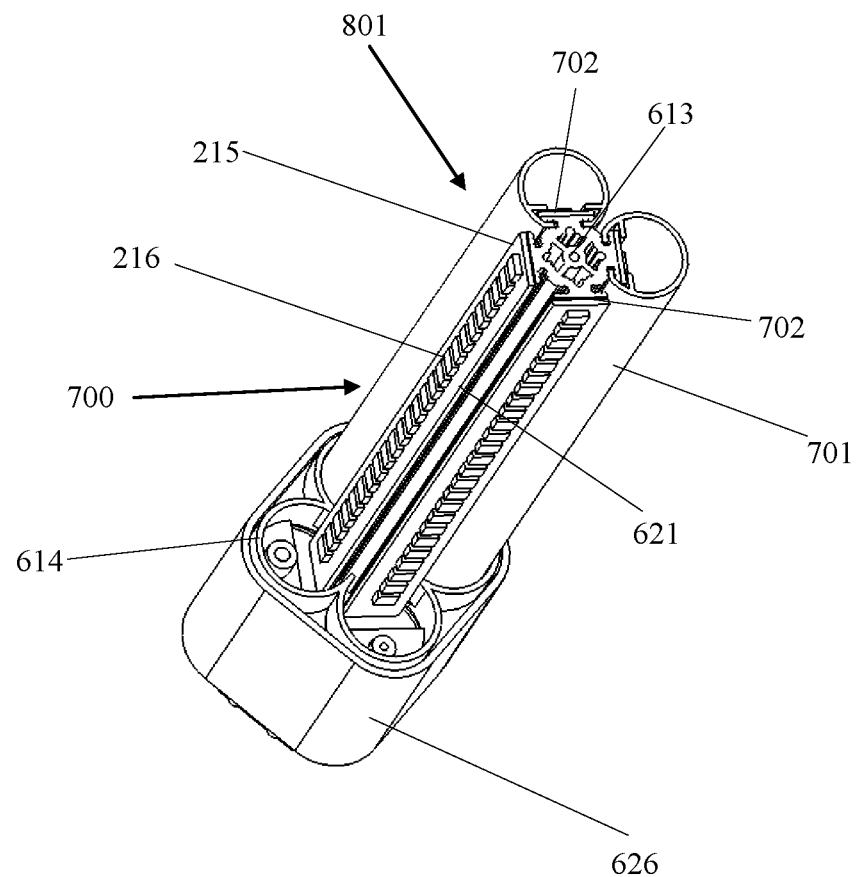
FIG. 13 is a perspective view of the LED lamp depicted in FIG. 12 with part of components removed in the LED lamp according to the present disclosure.
Figure 14:
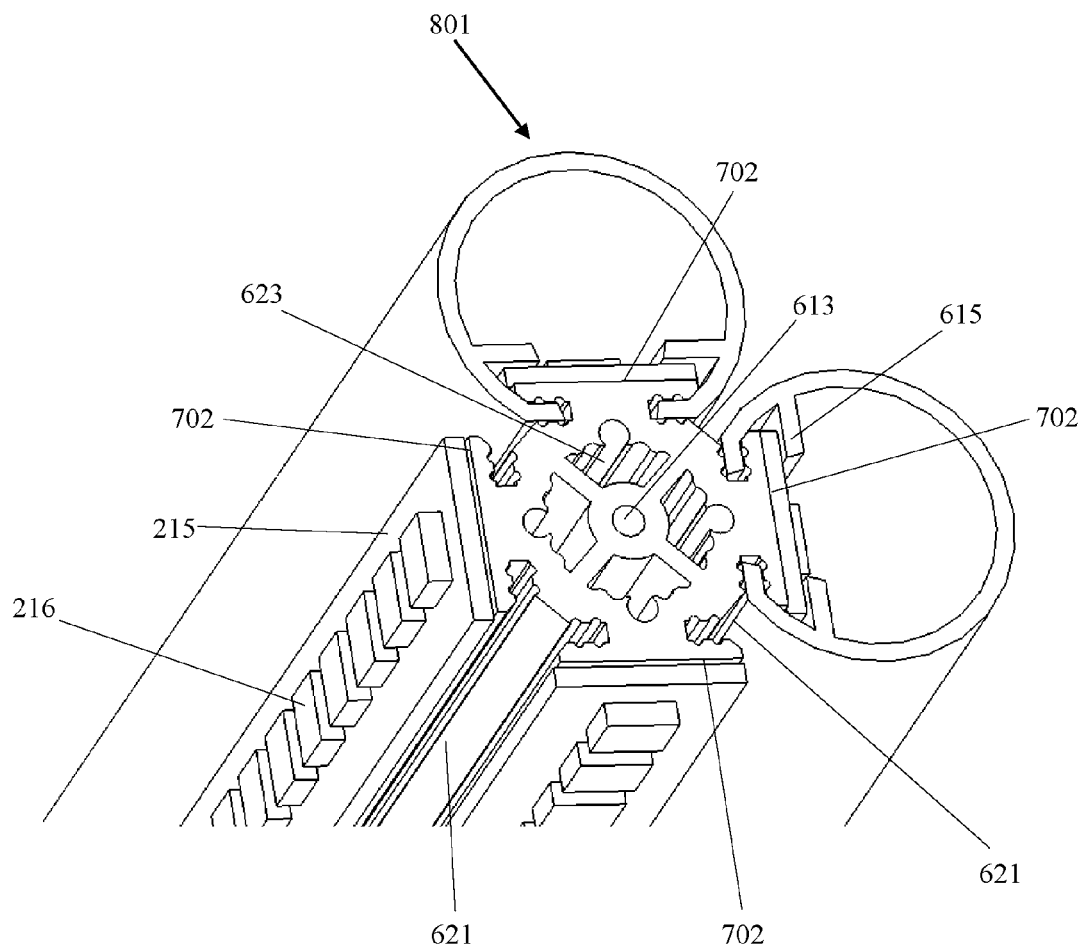
FIG. 14 is an expanded view of the light emission portion depicted in FIG. 13 according to the present disclosure.
Figure 15:
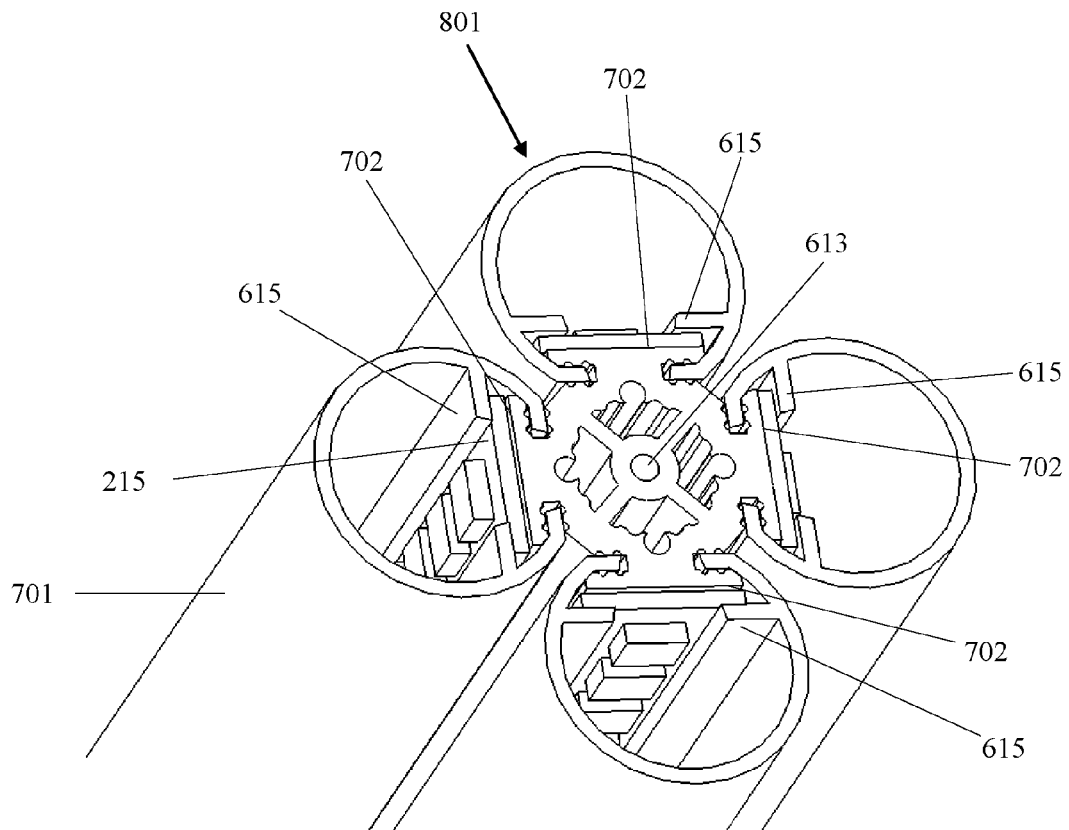
FIG. 15 is an expanded view of the light emission portion depicted in FIG. 14, showing how components are joined in the light emission portion according to the present disclosure.
Figure 16:
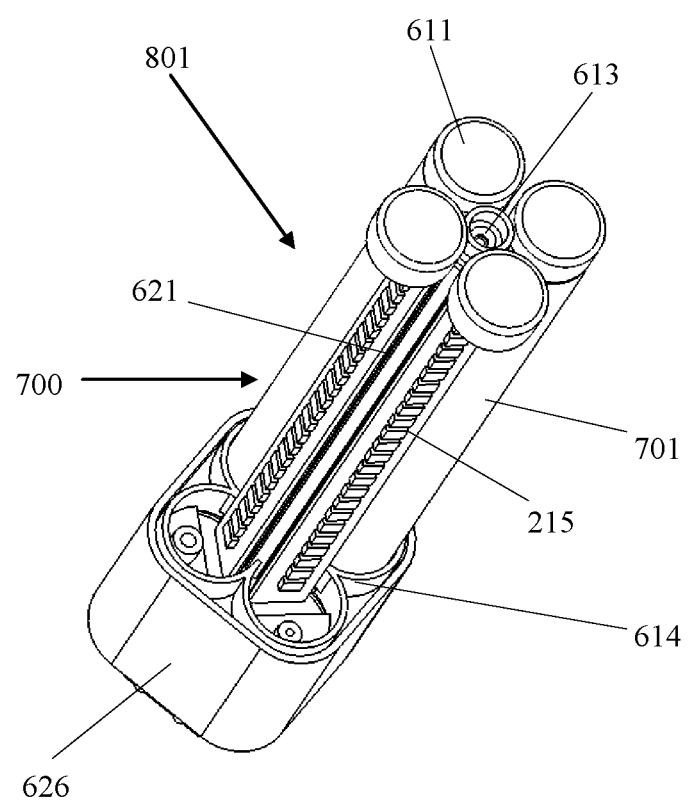
FIG. 16 is perspective view of an LED lamp depicted in FIG. 12, showing how the tube lenses can be mechanically secured in the LED lamp according to the present disclosure.

FIG. 13 is a perspective view of the LED lamp depicted in FIG. 12 with two of the tube lenses 701, the four lid lenses 611, and the cosmetic lid 612 removed. FIG. 14 is an expanded view of the light emission portion depicted in FIG. 13. Referring to FIGS. 13 and 14, the light emission portion 700 further comprises a heat sink portion 621 in the central area of the light emission portion 700 and four LED PCBs 215 each comprising a plurality of LEDs 216. The heat sink portion 621 further comprises a corrugated structure 623 and four mounting surfaces 702 (FIG. 14) on which the four LED PCBs 215 are mounted for heat dispersion. On the cross section of the heat sink portion 621 is a screw hole 613 in the center of the heat sink portion 621. In hollow space inside each of the four tube lenses 701 are two compartments divided by a pedestal 615. An upper compartment serves as a lens for LED light shaping and a lower compartment for mounting. The lower compartment has a structure to mate with the heat sink portion 621 such that the four tube lenses 701 are fixed with the heat sink portion 621. Furthermore, when each of the four tube lenses 701 is installed on the heat sink portion 621, the pedestal 615 compresses associated one of the LED PCBs 215 on one of the four mounting surfaces 702 in the heat sink portion 621 to improve heat dispersion. FIG. 15 is an expanded view of the light emission portion depicted in FIG. 14, showing how the heat sink portion 621, the four LED PCBs 215, and the four tube lenses 701 are joined together in the light emission portion. FIG. 16 is a perspective view of the LED lamp depicted in FIG. 12, showing how the tube lenses can be mechanically secured in the LED lamp. In FIG. 16, the four lid lenses 611 are joined together with a central hole concentric with the screw hole 613 on the heat sink portion 621 (FIG. 15). When the four lid lenses 611 are installed on the four tube lenses 701 and tightened by a screw in the screw hole 613, the four tube lenses 701 are fixed without movement. The cosmetic lid 612 (FIG. 12) is then used to cover the screw for better appearance.

Although in FIGS. 12-16, the electrical connection terminals comprise four terminals, the lamp base portion may comprise two electrical connection terminals. Although the light emission portion illustrated comprises four tube lenses, it may comprise one or more tube lenses, and the LED lamps may come in a wide variety of shapes and rest on various electrical connection terminals with different base types. Base types for two-pin plug-in LED lamps may comprise G23, GX23, and G24D. For four-pin plug-in LED lamps, base types may comprise G24Q, GX24Q, and 2G11. Furthermore, base types may comprise two-terminal GU24, GU10, GU5.3 and E-base types comprising E26, E27, and. E39.

Although the above embodiments use an LED lamp as an example, in fact, all the conventional fluorescent lamps used today can be replaced with the LED lamps adopting various lamp bases and the LED driving circuit, featuring as ballast compatible and AC main-operable.

Whereas preferred embodiments of the present disclosure have been shown and described, it will be realized that alterations, modifications, and improvements may be made thereto without departing from the scope of the following claims. Another LED driving circuit in an LED lamp using various kinds of combinations to accomplish the same or different objectives could be easily adapted for use from the present disclosure. Accordingly, the foregoing descriptions and attached drawings are by way of example only, and are not intended to be limiting.

What is claimed is:
1. A light-emitting diode (LED) lamp, comprising:
a plurality of LED printed circuit boards (LED PCBs);
a light emission portion comprising LED arrays disposed on the plurality of LED PCBs;
a lamp base portion connected to the light emission portion, the lamp base portion comprising electrical connection terminals;
an electrical adapter connected to the electrical connection terminals;
at least one bridge rectifier connected to the electrical adapter, the at least one bridge rectifier configured to convert an alternating-current (AC) input voltage into a direct-current (DC) voltage; and
an LED driving circuit configured to receive the DC voltage from the at least one bridge rectifier coupled with AC mains or a compact fluorescent (CFL) electronic ballast, the LED driving circuit comprising an electric current control circuit, a switch controlled by the electric current control circuit, a current sensing resistor, a diode, an inductor with its current charging and discharging controlled by the switch, and an output capacitor connected to the inductor to power up the LED arrays,
wherein, responsive to detecting a zero current in the inductor, the electric current control circuit generates a signal to turn on the switch, and
wherein the light emission portion further comprises at least one tube lens comprising a lid lens perpendicular to the at least one tube lens, the lid lens configured to cover an opening of the at least one tube lens and to secure the at least one tube lens without movement.

2. The LED lamp of claim 1, wherein the electrical adapter comprises at least one filament circuit configured to sustain an operation of the CFL electronic ballast to power the LED lamp.

3. The LED lamp of claim 1, wherein the electrical adapter comprises a matching circuit configured to optimize a resonant input voltage and a resonant input current provided by the CFL electronic ballast.

4. The LED lamp of claim 1, wherein the electrical adapter comprises at least one jumper connection between the electrical connection terminals.

5. The LED lamp of claim 1, wherein the LED driving circuit further comprises a power factor correction circuit configured to improve a power factor and to sustain operations of the LED arrays.

6. The LED lamp of claim 1, wherein the LED driving circuit further comprises a voltage feedback module comprising a diode, configured to sustain an operation of the electric current control circuit.

7. The LED lamp of claim 1, wherein the LED driving circuit further comprises a resistor in parallel with the output capacitor, configured to help build up an output voltage to power the LED arrays.

8. The LED lamp of claim 1, wherein the inductor in the LED driving circuit is of an autotransformer type.

9. The LED lamp of claim 1, wherein the inductor in the LED driving circuit comprises a primary winding of a transformer.

10. The LED lamp of claim 1, wherein the switch in the LED driving circuit operates at a switching frequency no less than 30 kHz.

11. The LED lamp of claim 1, wherein the electric current control circuit operates in a voltage range approximately between 9 V and 450 VDC.

12. The LED lamp of claim 1, wherein the light emission portion further comprises a heat sink portion disposed in a central area encircled by the LED PCBs.

13. The LED lamp of claim 1, wherein the electrical connection terminals comprise four pins comprising a base of G24Q, GX24Q, or 2G11.

14. The LED lamp of claim 1, wherein the electrical connection terminals comprise two pins comprising a base of G23, GX23, or G24D.

15. The LED lamp of claim 1, wherein the electrical connection terminals comprise two terminals comprising a base of GU24, GU10, or GU5.3.

16. The LED lamp of claim 1, wherein the electrical connection terminals comprise a base of E26, E27, or E39.

* * * * *